3,141,759
PROCESS FOR THE PRODUCTION OF FERTIL-
IZERS FROM TOWN REFUSE AND BLACK
LIQUOR
Jean Usse, Villemonble, and Henri Spindler, Grandchamp,
France, assignors to Compagnie Electro-Chimique du
Centre, Paris, France, a company
No Drawing. Filed Apr. 19, 1960, Ser. No. 23,141
Claims priority, application France Apr. 20, 1959
7 Claims. (Cl. 71—9)

The present invention relates to a method of producing fertilizer from town refuse.

Many difficulties are experienced in urban centres in disposing of refuse which must be collected and generally treated. Incineration of such refuse proves to be a costly operation, but on the other hand its removal to dumping areas creates insanitary conditions. It is also regrettable that the considerable quantities of organic materials contained in such town refuse are lost and cannot be used as fertilizing material.

Various processes have therefore been developed for converting such refuse into fertilizers by composting. All these processes have in common a treatment which involves conveying installations, the separation of the unusable products (scrap iron, ash and the like) and finally the crushing of the portion of the town refuse which is to be subjected to composting.

This portion is immediately thereafter subjected to biological transformations by various methods such as the following:

Some installations utilize closed tanks in which anaerobic or anoxybiotic fermentation takes place; this results in a considerable loss of organic materials and gives products whose effectiveness is less than that of products obtained by aerobic fermentation.

There also exist mechanical methods, the object of of which is to establish in rotating drums intimate contact between the air and the crushed refuse in order to accelerate the fermentation; this method is harmful to the normal evolution of the composting, which requires several stages for the production and action of various bacterial and cryptogamic groups.

Finally, a method now practised utilizes an oxybiotic fermentation a dump with sufficient aeration, which fermentation is controlled and activated by adding biological preparations, and bacterial and cryptogamic cultures.

The process according to the present invention is characterized by the fact that the town refuse or the like is subjected prior to fermentation to a chemical modification consisting in incorporating therein substances capable of neutralizing the acidity which arises at the very commencement of the fermentation.

More especially, in accordance with the invention, there may be used as the neutralizing substances the residual juices from the treatment of cellulosic materials, notably of straw, with caustic soda, which are usually called "black liquor." The residual juices resulting from other forms of treatment may also be employed provided that their composition is appropriately corrected to neutralize the acidity resulting from the fermentation of the treated refuse.

The mixture of town refuse and of black liquor is preferably malaxated in such a manner as to achieve homogeneous neutralization of the acidity.

The mixture may thereafter be left to form a compost, in which it loses about 45% of its weight of water and takes on the appearance of a granular product ready for use as a fertilizer.

Applicants' research has shown that a combination of town refuse with waste from the paper industry gives products of higher quality than those obtained by the existing processes. The reasons for this superiority are as follows:

(1) Since the black liquor results from the boiling of straw with caustic soda, the alkalinity of these liquors neutralizes the acidity which is first manifested in the course of the fermentation of the town refuse when left to itself.

This lactic fermentation stops the microbic activity.

By thus establishing a neutral medium at the beginning of the composting, the period of the fermentation and the time necessary for the establishment of the biological self-adjustments of the pH of the products of the composting are substantially shortened.

(2) The sodium contained in the black liquor is an element which favors the metabolism of the Streptomycetes necessary for the working up of the humic products. This utilization of the sodium by these organisms contributes to the complete disappearance of the harmful effects attributed to the caustic soda employed in the alkaline treatment of straw.

(3) These black juices contain appreciable quantities of soluble silicates which improve the colloidal state of the material undergoing composting due to the formation of colloidal silica and of silico-humic complexes.

(4) The black liquor from the paper industry also introduce the incrustant of straw, which constitutes a fermentable element which is favorable for the metabolism of Ascomycetes.

(5) The black juices, and more especially the black liquor obtained by the boiling of straw, supplies appreciable quantities of NPK fertilizers, since the proportions of these elements available in the black liquor obtained in the alkaline digestion of straw are comparable to those found by analysis of liquid farm manure.

The following are non-limiting examples of procedures which may be adopted according to the present invention.

*Example 1*

The residual juices from the manufacture of straw pulp, or black liquor, are incorporated in screened and crushed town refuse containing 45% of moisture and about 60% of organic materials, expressed in relation to the 100% dry product. The mixture is prepared in the proportion of one liter of black liquor to three kilograms of town refuse.

This black liquor, which has a density of 6° Baumé, is obtained in the course of the treatment of wheat straw pulp with caustic soda at 100° centigrade, and is extracted from the outlet of the digester by means of a press.

The intimate mixing of the black liquor with the town refuse is effected by means of a mixing screw which effects a thorough malaxation of the refuse.

The mixture thus prepared is finally subjected to composting in the open air. During this composting a loss of water is observed, and the product obtained is finally granular and contains about 40% of water.

*Example 2*

The treated refuse contains more than 66% of organic materials expressed in relation to the 100% dry product, which is usually the case with summer refuse, which contains relatively less ash than winter refuse. This refuse is crushed, screened and reduced to 45% of moisture.

It is mixed with a black liquor having a density of from 4° to 5° Baumé, in a proportion of 3 kilograms of refuse to 2 liters of black liquor.

This mixture is treated as in Example 1.

Example 3

The refuse treated contains less than 60% of organic materials, for example 55% of organic materials and 45% of ash and other inorganic materials (which may be the case with winter refuse).

Naturally, this refuse may be freed from some of the ash before the treatment according to the invention so as to restore the proportion referred to in either of the foregoing Examples 1 and 2.

However, the said refuse may be used without modification by adding thereto additional organic materials in a quantity such that the percentage of ash does not exceed 40% of the total treated material.

In this example, there are mixed:

| | |
|---|---|
| Refuse containing 55% of organic material____kg__ | 3 |
| Chopped or crushed straw_____kg__ | 0.3 |
| Black liquor (between 4° and 5° Baumé)___liters__ | 2 |

(Having a moisture content of 45%), the remainder of the operation being carried out as in Example 1.

Example 4

| | |
|---|---|
| Refuse containing 55% of organic material____kg__ | 3 |
| Sawdust _____kg__ | 0.6 |
| Black liquor (between 4° and 5° Baumé)____liters__ | 2 |

(Having a moisture content of 45%.)

The remainder of the operation is carried out as in Example 1.

Example 5

| | |
|---|---|
| Refuse containing 55% of organic material____kg__ | 3 |
| Waste from the paper industry emanating from rejected pulp which cannot be used for the manufacture of paper_____kg__ | 0.9 |
| Black liquor (between 4° and 5° Baumé)___liters__ | 2 |

(Having a moisture content of 45%.)

The remainder of the operation is carried out as in Example 1.

Various modifications may be envisaged without departing from the scope of the invention.

Thus, it is possible more especially:

To add to the residual straw juices or black liquor, the black liquor obtained by alkaline digestion of other plants, notably wood, To keep with the added black liquor the cellulosic portion contained in the digesting medium, To add to the mixture certain wastes such as sawdust or waste from the paper industry which is intended for the improvement of the aeration during the composting, To add in the course of the foregoing operations the conventional fertilizers N, P, K, in any appropriate form.

What we claim is:

1. In a method of producing a granular fertilizer from town refuse containing substantial moisture and including fermentable organic waste material, the steps of mixing a mass of said town refuse including a major proportion of said fermentable organic material with a proportion of black liquor from the alkaline digestion of cellulosic material sufficient to chemically condition said resulting mixture prior to fermentation thereof; then subjecting the thus-formed mixture to fermentation, said proportion of said black liquor in said mixture being so chosen as to at least substantially neutralize the increase in acidity caused by said fermentation; and recovering said granular fertilizer.

2. In a method of producing a granular fertilizer from town refuse containing substantial moisture and including fermentable organic waste material, the steps of mixing a mass of said town refuse including a major proportion of said fermentable organic material equal to about 60% of said mass on a dry basis with a proportion of black liquor from the alkaline digestion of cellulosic material sufficient to chemically condition said resulting mixture prior to fermentation thereof; then subjecting the thus-formed mixture to fermentation, said proportion of said black liquor in said mixture being so chosen as to at least substantially neutralize the increase in acidity caused by said fermentation; and recovering said granular fertilizer.

3. In a method of producing a granular fertilizer from town refuse containing substantial moisture and including fermentable organic waste material, the steps of mixing a mass of said town refuse having a moisture content of about 45% and including a major proportion of said fermentable organic material equal to about 60% of said mass on a dry basis with a proportion of black liquor from the alkaline digestion of cellulosic material sufficient to chemically condition said resulting mixture prior to fermentation thereof; and subjecting the thus-formed mixture to fermentation, said proportion of said black liquor in said mixture being so chosen as to at least substantially neutralize the increase in acidity caused by said fermentation; and recovering said granular fertilizer.

4. In a method of producing a granular fertilizer from town refuse containing substantial moisture and including fermentable organic waste material, the steps of mixing a mass of said town refuse including a major proportion of fermentable organic material with a proportion of black liquor of between 4° and 6° Baumé from the alkaline digestion of cellulosic material sufficient to chemically condition said resulting mixture prior to fermentation thereof; and subjecting the thus-formed mixture to fermentation, said proportion of said black liquor in said mixture being so chosen as to at least substantially neutralize the increase in acidity caused by said fermentation; and recovering said granular fertilizer.

5. In a method of producing granular fertilizer from town refuse containing substantial moisture and including fermentable organic waste material, the steps of mixing a mass of said town refuse including a major proportion of said fermentable organic material with a proportion of black liquor of between 4° and 6° Baumé from the alkaline digestion of cellulose material, said predetermined proportion being equal to between 1 and 2 liters of said black liquor per 3 kg. of said mass of town refuse and sufficient to chemically condition said resulting mixture prior to fermentation thereof; and subjecting the thus-formed mixture to fermentation, said proportion of said black liquor in said mixture being so chosen as to at least substantially neutralize the increase in acidity caused by said fermentation; and recovering said granular fertilizer.

6. In a method of producing a granular fertilizer from town refuse containing substantial moisture and including fermentable organic waste material, the steps of mixing a mass of said town refuse including a major proportion of less than 60% of fermentable organic material with additional fermentable material of organic origin so as to adjust the total fermentable material to about 60% of said mass on a dry basis; admixing a proportion of black liquor from the alkaline digestion of cellulosic material sufficient to chemically condition said resulting mixture prior to fermentation thereof; and subjecting the thus-formed mixture to fermentation, said proportion of said black liquor in said mixture being so chosen as to at least substantially neutralize the increase in acidity caused by said fermentation and recovering said granular fertilizer.

7. In a method of producing a granular fertilizer from town refuse containing substantial moisture and including fermentable organic waste material, the steps of mixing a mass of said town refuse including a major proportion of said fermentable organic material with a proportion of black liquor from the alkaline digestion of straw with caustic soda sufficient to chemically condition said resulting mixture prior to fermentation thereof; then subjecting the thus-formed mixture to fermentation, said proportion of said black liquor in said mixture being so chosen as to at least substantially neutralize the increase in acidity caused by said fermentation; and recovering said granular fertilizer.

References Cited in the file of this patent

UNITED STATES PATENTS

| | | |
|---|---|---|
| Re. 15,417 | Beccari | July 25, 1922 |
| 1,881,557 | Heykenskjold | Oct. 11, 1932 |
| 2,158,918 | Townsend | May 16, 1939 |
| 2,220,134 | Townsend | Nov. 5, 1940 |
| 2,285,834 | Proctor | June 9, 1942 |
| 2,490,078 | Meiler | Dec. 6, 1949 |
| 2,697,659 | MacIntire | Dec. 21, 1954 |
| 2,947,619 | Gorby | Aug. 2, 1960 |